(12) United States Patent
Wees

(10) Patent No.: US 11,096,371 B2
(45) Date of Patent: Aug. 24, 2021

(54) ANIMAL LITTER SIFTER

(71) Applicant: Amy Leah Wees, San Antonio, TX (US)

(72) Inventor: Amy Leah Wees, San Antonio, TX (US)

( * ) Notice: Subject to any disclaimer, the term of this patent is extended or adjusted under 35 U.S.C. 154(b) by 396 days.

(21) Appl. No.: 15/887,128

(22) Filed: Feb. 2, 2018

(65) Prior Publication Data

US 2018/0228123 A1     Aug. 16, 2018

Related U.S. Application Data

(60) Provisional application No. 62/457,622, filed on Feb. 10, 2017.

(51) Int. Cl.
*A01K 1/01*     (2006.01)
(52) U.S. Cl.
CPC .................................. *A01K 1/0114* (2013.01)
(58) Field of Classification Search
CPC .................................................. A01K 1/0114
USPC ......................................................... 119/167
See application file for complete search history.

(56) References Cited

U.S. PATENT DOCUMENTS

| | | | | |
|---|---|---|---|---|
| 3,809,013 A * | 5/1974 | Rigney | ................ | A01K 1/0107 119/167 |
| 4,308,825 A * | 1/1982 | Stepanian | ............ | A01K 1/0114 119/167 |
| 4,312,295 A * | 1/1982 | Harrington | .......... | A01K 1/0114 119/167 |
| 4,615,300 A * | 10/1986 | McDonough | ........ | A01K 1/0114 119/167 |
| 4,723,510 A * | 2/1988 | Skillestad | ............ | A01K 1/0125 119/167 |
| 4,784,082 A * | 11/1988 | Wolfe | .................. | A01K 1/0107 119/167 |
| 4,802,442 A * | 2/1989 | Wilson | ................. | A01K 1/0114 119/166 |
| 4,817,560 A * | 4/1989 | Prince | .................. | A01K 1/0114 119/166 |
| 4,848,274 A * | 7/1989 | Yananton | ............. | A01K 1/0107 119/169 |
| 4,870,924 A * | 10/1989 | Wolfe | .................. | A01K 1/0107 119/167 |
| 5,031,578 A * | 7/1991 | Hammons | ............ | A01K 1/0114 119/167 |
| 5,121,712 A * | 6/1992 | Schulein, Jr. | ........ | A01K 1/0114 119/167 |
| 5,158,042 A * | 10/1992 | Hammerslag | ........ | A01K 1/0114 119/165 |
| 5,207,772 A * | 5/1993 | Lauretta | ............... | A01K 1/0114 119/167 |
| 5,325,815 A * | 7/1994 | Gumpesberger | ..... | A01K 1/0114 119/166 |

(Continued)

*Primary Examiner* — Claude J Brown
(74) *Attorney, Agent, or Firm* — Andrew Morabito

(57) ABSTRACT

The animal litter sifter comprising, a sifter receptacle having an internal chamber with an opening, and having a top edge, a sifter frame sized to rest on the top edge of the sifter receptacle, wherein the sifter receptacle having an opening substantially aligned with the sifter receptacle opening, and a sifter basket having a plurality of side walls converging towards a bottom extending into the sifter receptacle and secured to the sifter frame, wherein at least one sidewall having a impermeable and the remaining sidewalls having a plurality of passages therethrough.

7 Claims, 7 Drawing Sheets

(56) References Cited

U.S. PATENT DOCUMENTS

| | | | | |
|---|---|---|---|---|
| 5,372,095 A * | 12/1994 | Dowling | A01K 1/0114 119/166 |
| 5,419,282 A * | 5/1995 | Dennis | A01K 1/0114 119/166 |
| D363,369 S * | 10/1995 | Hoth | D30/161 |
| 5,507,248 A * | 4/1996 | Gabbert | A01K 1/0114 119/166 |
| 5,551,376 A * | 9/1996 | Lundeen | A01K 1/0114 119/167 |
| 5,564,366 A * | 10/1996 | Hancock | A01K 1/0107 119/165 |
| 5,598,811 A * | 2/1997 | Merchant | A01K 1/0114 119/166 |
| 5,752,466 A * | 5/1998 | Lundeen | A01K 1/0114 119/167 |
| 5,893,336 A * | 4/1999 | Vice | A01K 1/0114 119/166 |
| 5,983,832 A * | 11/1999 | Seo | A01K 1/0114 119/166 |
| 6,401,660 B1 * | 6/2002 | Wolff | A01K 1/0114 119/165 |
| 6,561,130 B1 * | 5/2003 | Sage, Jr. | A01K 1/0107 119/166 |
| 6,595,159 B1 * | 7/2003 | Montalbano | A01K 1/0114 119/167 |
| 6,668,755 B1 * | 12/2003 | Koster | A01K 1/0114 119/167 |
| 6,745,719 B1 * | 6/2004 | Howerton | A01K 1/0114 119/166 |
| 2009/0194033 A1 * | 8/2009 | Modlin | A01K 1/0107 119/167 |
| 2011/0011347 A1 * | 1/2011 | Ohlman | A01K 1/0114 119/167 |
| 2012/0210943 A1 * | 8/2012 | Omps | A01K 1/0114 119/166 |
| 2013/0112149 A1 * | 5/2013 | Robbins | A01K 1/011 119/166 |
| 2013/0133585 A1 * | 5/2013 | Hecht | A01K 1/0114 119/166 |
| 2014/0283753 A1 * | 9/2014 | Dawn | A01K 1/0114 119/166 |
| 2018/0020635 A1 * | 1/2018 | Huang | A01K 1/0114 119/166 |
| 2018/0042199 A1 * | 2/2018 | Smith | A01K 1/0114 |
| 2018/0192610 A1 * | 7/2018 | Petty | A01K 1/0114 |

\* cited by examiner

ANIMAL LITTER SIFTER

BACKGROUND

The present invention disclosed herein relates to an animal litter cleaning system and method to remove animal waste from the animal litter using a sifting or sieving apparatus in order to reuse the litter. The present invention provides a means to clean animal litter using little or no sieving or sifting motion exertion by the user. The present invention is also a system that allows ease of removal and disposal of the sifted waste that has been removed from the litter. In addition, the present invention separates the sifting apparatus from an animal litter box in order to allow ease of cleaning the animal litter box.

Devices and systems have been previously devised to clean animal waste from animal litter. Cleaning animal waste from litter boxes in a cost effective-manner requires removing or sifting the waste by hand or using automated sifting devices that employ a sifting or sieving apparatus. The waste can be sieved or sifted directly to remove it from the litter. The animal waste may also be separated and removed as material that consists of the waste combined with litter that has been designed to stick or adhere to the waste in clumps. Once the waste has been removed, the cleaned litter may then be re-used.

Removing and disposing the sifted waste from the sifting apparatus can be difficult due to clumps and waste that stick to the sifting apparatus or which are difficult to pour out from the sifting apparatus into a waste disposal container. Manually scooping the litter using a sifting scoop requires effort to dispose of the waste and allows for significant litter spillage. Self-cleaning or robotic litter boxes are expensive and are prone to waste sticking to the cleaning apparatus.

In addition, the litter and animal waste waste of litter boxes are relatively heavy materials. Sifting the litter requires shaking or introducing sieving motion to the sifter and its heavy waste in order to allow separation of clean litter from waste or waste clumps. Introducing the sieving motion, manually, may be difficult for some individuals.

Therefore, it is desired that a litter cleaning invention utilizes a removable litter sifter basket having a grid, mesh, holes or other appropriately sized orifices and a receptacle bin, which together form a separate device from the litter box. The separation of the present invention, from a litter box which that is to be cleaned, allows easy cleaning of the litter box. The present invention also allows the use of scooped or curved walls, optionally having a lip, integrated into the litter sifter basket, which lip allow ease of disposal of the waste cleaned from the litter. In addition, the present invention may optionally provide for a mechanical or motorized shaking element that imparts automated sifting motion so that the user is not required to lift and shake the litter to be cleaned.

BRIEF SUMMARY OF THE INVENTION

The present invention as disclosed herein provides a means to clean litter using sieving or sifting device to remove the waste with little physical exertion or strength of the user. The present invention allows ease of removal and disposal of the sifted waste that has been removed from the litter. In addition, the present invention separates the sifting apparatus from an litter box in order to allow ease of cleaning the litter box.

The intended purpose of the invention is to sift and temporarily store litter for cleaning purposes, separating waste from clean litter through use of a sifting apparatus and holding bin.

In one embodiment an litter sifter comprising, a sifter receptacle having an internal chamber with an opening, and having a top edge, a sifter frame sized to rest on the top edge of the sifter receptacle, wherein the sifter receptacle having an opening substantially aligned with the sifter receptacle opening, and a sifter basket having a plurality of side walls converging towards a bottom extending into the sifter receptacle and secured to the sifter frame, wherein at least one sidewall having an impermeable and the remaining sidewalls having a plurality of passages therethrough.

In another embodiment an litter sifter comprising, a sifter receptacle having an internal chamber with an opening, and having a top edge, a sifter frame sized to rest on the top edge of the sifter receptacle, wherein the sifter receptacle having an opening substantially aligned with the sifter receptacle opening, and a sifter basket having a front sidewall, a second sidewall, a third sidewall, and a forth sidewall converging towards a bottom wall, wherein the sidewalls extend into the sifter receptacle and are secured to the sifter frame and the first sidewall and the second sidewall are impermeable and opposing one another and the third sidewall, the fourth sidewall, and the bottom wall having a plurality of passages therethrough.

DETAILED DESCRIPTION

Figure 1:
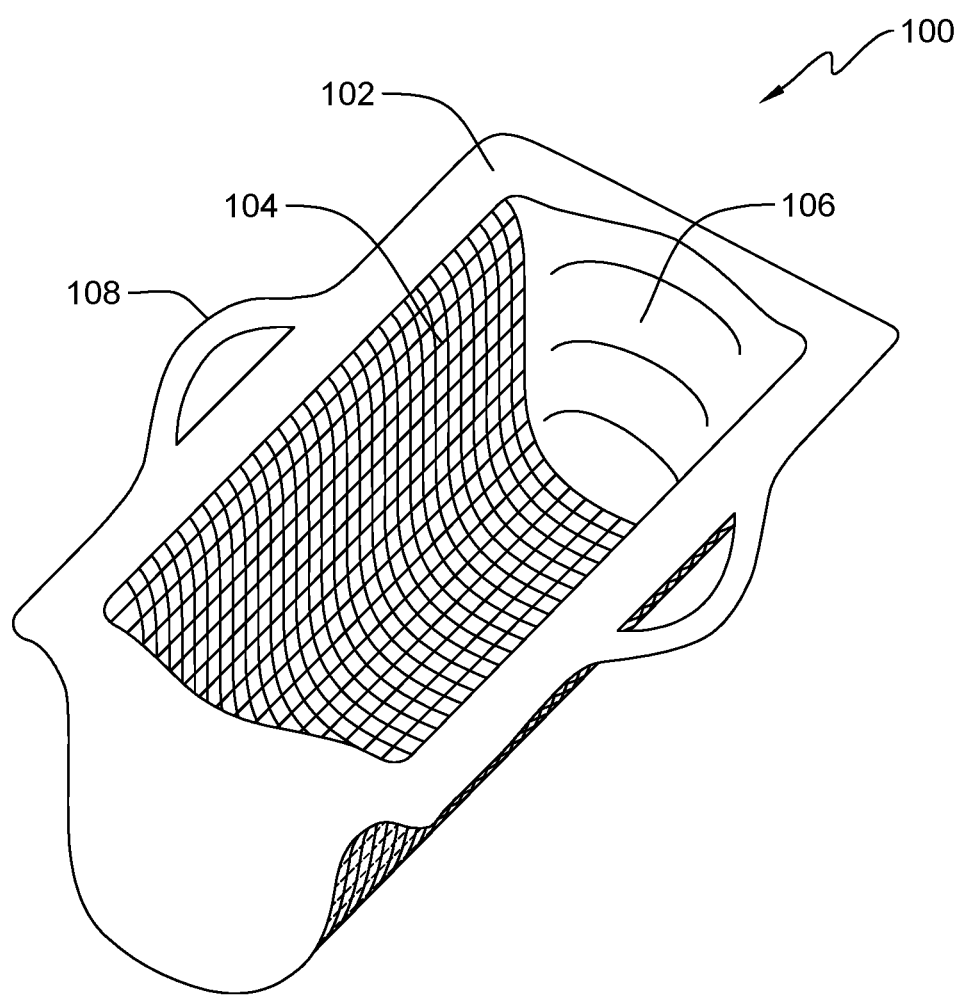
FIG. 1 illustrates a perspective view of an embodiment of a litter sifter basket of the present invention.

The following descriptions are considered to be illustrative of the principles of the present invention and are not intended to be limiting. One of skill in the art will recognize and understand that there are suitable modifications and equivalents that may be used which fall within the scope of the invention described herein. The use of singular forms "a," "an," and "the" include plural references unless the context clearly requires otherwise. The embodiments are not limited to those illustrated in the drawings. It should also be understood that the drawings are not necessarily to scale. In certain instances, details may have been omitted that are not necessary for an understanding of the embodiments disclosed herein, for example, conventional fabrication and assembly.

FIG. 1 illustrates a perspective view of an embodiment of a litter sifter basket 100 of the present invention. The litter sifter basket 100 is comprised of a frame 102, a screen 104, a lip 103, end plate 106, and handles 108. The frame 102 is integrated with the handles 108, the lip 103, and the end plate 106 with the screen 104 attached to frame 102 and the end plate 106 to form a closed compartment.

The frame 102 is designed to provide the support for the litter sifter basket 100. The frame 102 in the depicted embodiment, is a substantially cuboid shape. In additional embodiments, the frame 102 may have various shapes which are designed to mate with a receptacle 200. The frame 102 has an extended portion, referred to as the lip 103, which is designed to extend over the top edge of the receptacle 200 so as to not allow the litter sifter basket 100 to fall into the receptacle 200. The lip 103 extends a predetermined distance from the inside edge of the frame 102. The frame 102, may be formed of any rigid or semi-rigid material, for example, metal, wood, or plastic material.

The handles 108 have an ergonomic shape and design as well as a position to allow for easy remove of the sifter basket 100 from the receptacle 200. In the depicted embodiment, the handles 108 are located on opposite sides, substantially aligned down a center axis of the sifter basket 100.

The screen 104 defines openings through which litter may pass and which is attached to the frame 102, at a plurality of points along the frame 102, but before the lip 103. In this embodiment, the screen 104 forms a downward loop. In additional embodiments, the screen 104 may form various shapes and curvatures. The screen 104, may be formed of any rigid or semi-rigid material, for example, metal or plastic mesh, metal, wood, or plastic surface in which are formed a plurality of openings. In one embodiment, the screen 104 has openings a width of from about 0.15 to about 1.0 cm. In additional embodiments, the opening width may be altered depending on the type of litter material designed to sift, for example, small pine bedding, may require larger openings. The widths of the openings in the screen 104 may be selected and chosen for use for specific types of litter. The screen 104 attachment points may be formed by manufacture of the screen 104 as an integral part of the frame 102, or by separate attachment method, for example by gluing, stapling, or heat melting, or by insertion into the frame 102, through openings which may be created. In some embodiments, the screen 104 is detachable from the frame 102.

The end plate 106 are integrated into the frame 102 and the screen 104 and are designed to give a solid surface to pour waste of the litter sifter basket 100 into another receptacle such as a garbage can. In the depicted embodiment, there are two end plate 106 with a concaved design. In additional embodiments, there may be one end plate 106. The end plate 106 may have a various curvatures and designed to allow for centralizing the waste of the litter sifter basket 100 to allow for an easier and cleaning pour. In the depicted embodiment, the end plate 106 have ridges to assist in slowing the flow of the waste to further control the pouring of the waste. In the depicted embodiment, the end plate 106 and the frame 102 are a uniform component. In additional embodiments, the end plate 106 is a separate component. In some embodiments, the end plate 106 are detachable from the frame 102.

Figure 2:
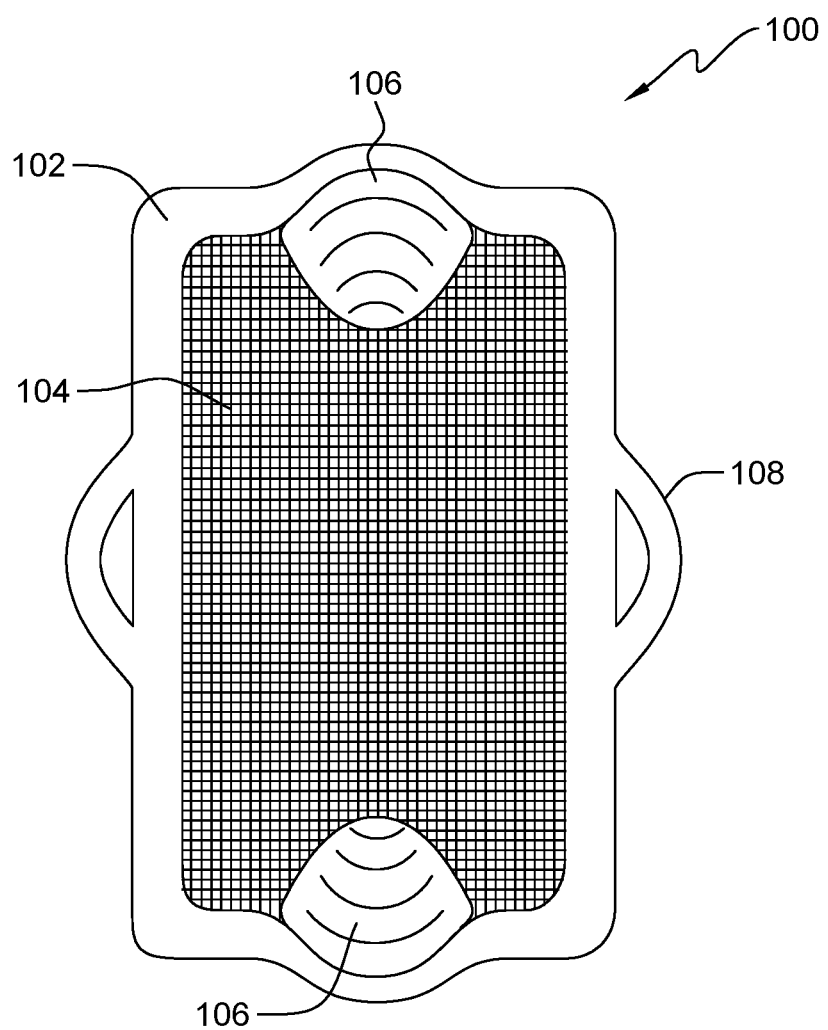
FIG. 2 illustrates a top view of an embodiment of the litter sifter basket of the present invention.

FIG. 2 illustrates a top view of an embodiment of the litter sifter basket 100 of the present invention. The frame 102 is shown with the lip 103. The handles 108 are shown substantially parallel and substantially at the center of the sides of the frame 102. The end plate 106 are shown. In the end plate 106 may extend various distances downwards and towards the center of the screen 104. In the depicted embodiment, the end plate 106 have a predetermined concavity, and angle to assist in directing the litter to the center and/or bottom of the screen 104 to reduce the opportunity for waste to exit the sifter basket 100. In some embodiments, the curved sides 116 may have an anti-stick coating or the like to further assist the movement of the waste into the receptacle 200. In some embodiments, the screen 104 additionally has the anti-stick coating.

Figure 3:
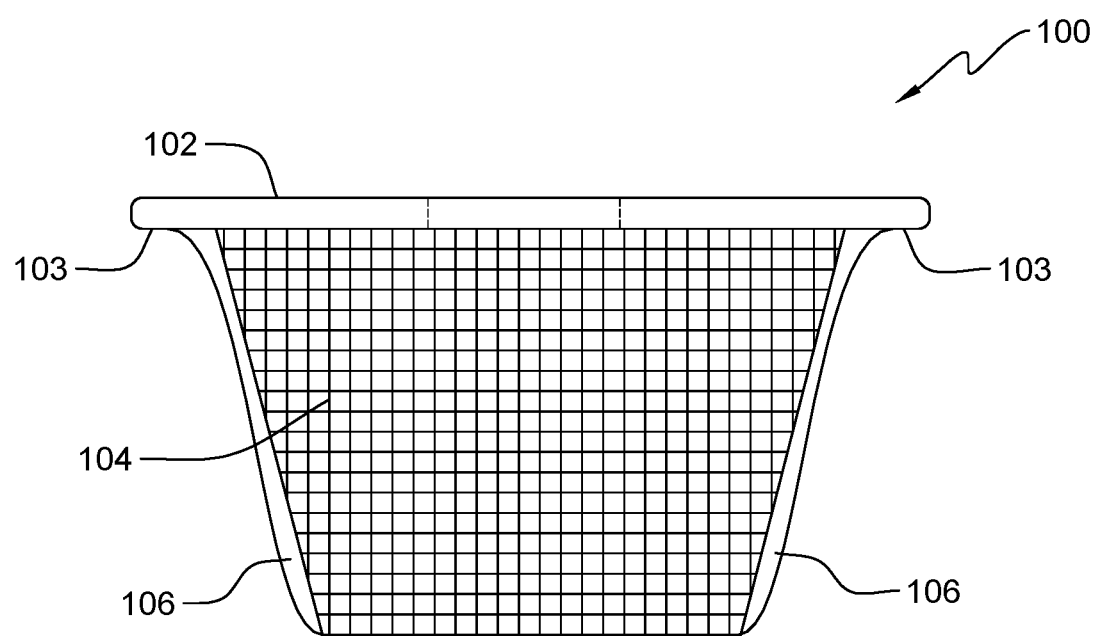
FIG. 3 illustrates a front view of an embodiment of the litter sifter basket of the present invention.

FIG. 3 illustrates a front view of an embodiment of the litter sifter basket 100 of the present invention. In this embodiment, the screen 104 forms a downward loop, which projects from the frame 102. In the depicted embodiment, the screen 104 has a curved cuboid shape similar to the receptacle 200. In additional embodiment the screen 104 may have various shapes and contours based on the intended purpose and the specific types of litter which is poured into the screen 104. Preferable, the sides of the screen 104, extend a predetermined distance. In the depicted embodiment, the handles 108 are flush with the top surface of the frame 102. In additional embodiments, the handles 108 may have a curved or varied shape. The frame 102 is also substantially the same thickness throughout. In various embodiments, the frame 102 may have varying thicknesses, as well as the lip 103 to accommodate various receptacle bins 200.

Figure 4:
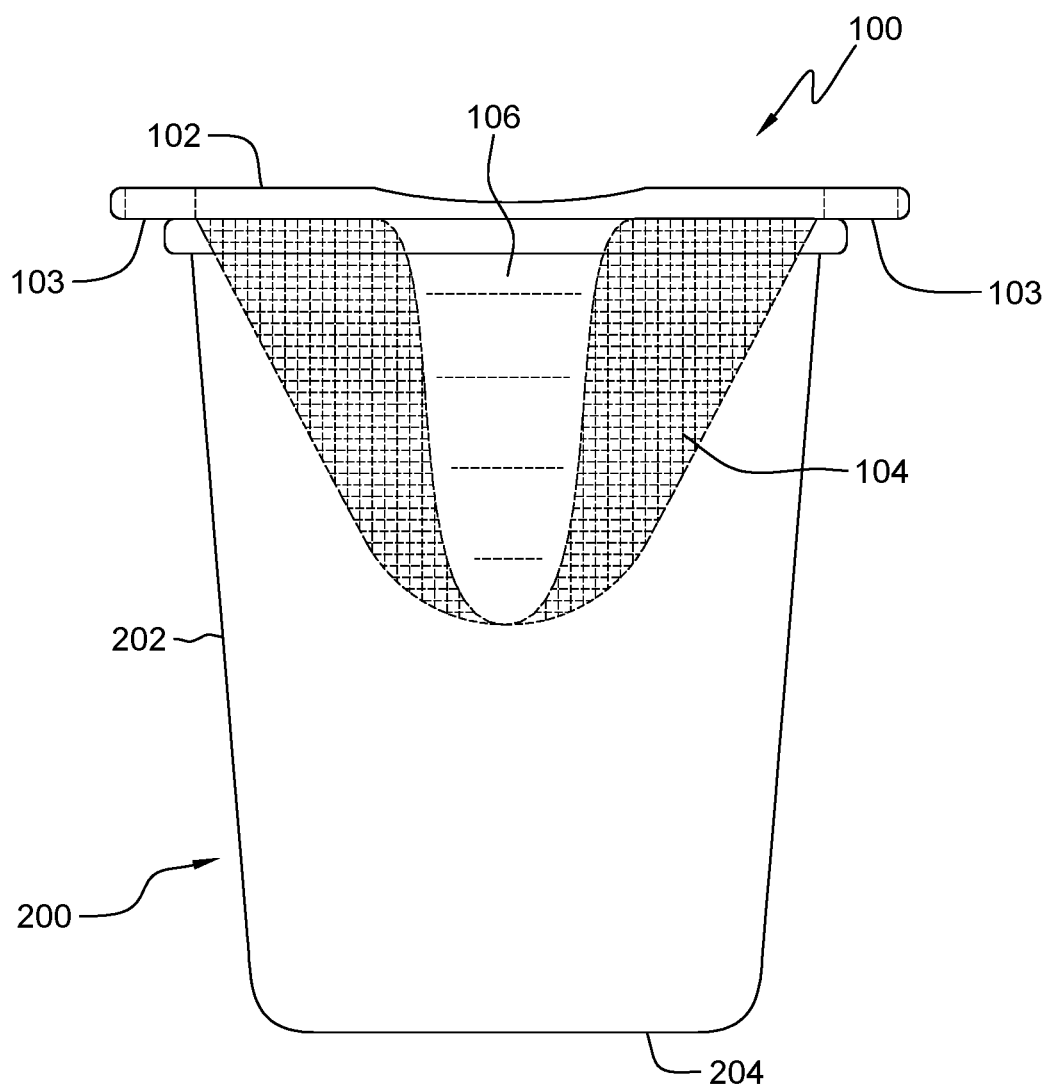
FIG. 4 illustrates a side view of an embodiment of the present invention wherein the litter sifter basket is contained within a receptacle bin of the present invention.

FIG. 4 illustrates a side view of an embodiment of the present invention wherein the litter sifter basket 100 is contained within a receptacle 200 of the present invention.

The receptacle 200 should be of a height which allows easy sifting of the litter, for example, the receptacle 200 can be twice the height of the screen 104 downward loop. For example, the receptacle 200 may be approximately (twelve) 12 inches or more in height to accommodate easy sifting. The height of the receptacle 200 should accommodate the space needed to sift and sift litter for at least one litter box full of standard clumping or non-clumping, for example, clay, silica, or natural cat litters. The receptacle 200 can be made of any lightweight rigid material. Preferably the receptacle 200 is made of plastic to allow for lightweight lifting, durability, and ease of cleaning. Plastics which are contemplated include any polymers which can be molded into the three-dimensional shape of a receptacle defining a void in which the sifting apparatus. The receptacle 200, is a vessel which defines a void therein. The void may be of any shape that allows litter to be sifted and separated from the waste. In the depicted embodiment, the receptacle 200, has a rectangular cuboid shape, four vertical sides 202, a bottom surface 204 which is comprised of a substantially flat surface. The receptacle 200, further has a flattened receptacle top edge 206, formed therein at the top of the vertical sides 202. The receptacle 200 may have various shapes, number of vertical sides 202 and dimensions.

In the depicted embodiment sifter basket 100 sides atop the top edge 206 of the receptacle 200. The frame 102 and the lip 103 contact the top edge 206 and substantially align. The lip 103, is capable of resting on the top edge 206, so that when the lip 103, comes in contact with the top edge 206 substantially around the entire sifter basket 100. The two parts contact one another in a continuous and close-fitting junction. In additional embodiments, the lip 103 and the top edge 206 may have a fastening means or lock to secure the sifter basket 100 and the receptacle 200 together. This may include, but not limited to fasteners, latches, pressure fitments, magnets, or the like.

The close-fitting junction 114, may be achieved by manufacturing the receptacle edge 105, and the lip 103, in a manner that allows the continuous and close-fitting junction 114, to be a collinear or substantially collinear interface between the lip 103, and the receptacle edge 105. In an example embodiment, the distance between the lip 103, and the receptacle edge 105, in the continuous and close-fitting junction 114, is less than the average size of the clean litter pieces which are to be sifted from the waste material. This distance prevents clean litter from exiting the close-fitting junction 114. Alternatively, the lip 103, may fit tightly within or over and around the receptacle edge 105, in a similar fashion to create a continuous and close fitting junction 114.

Figure 5:
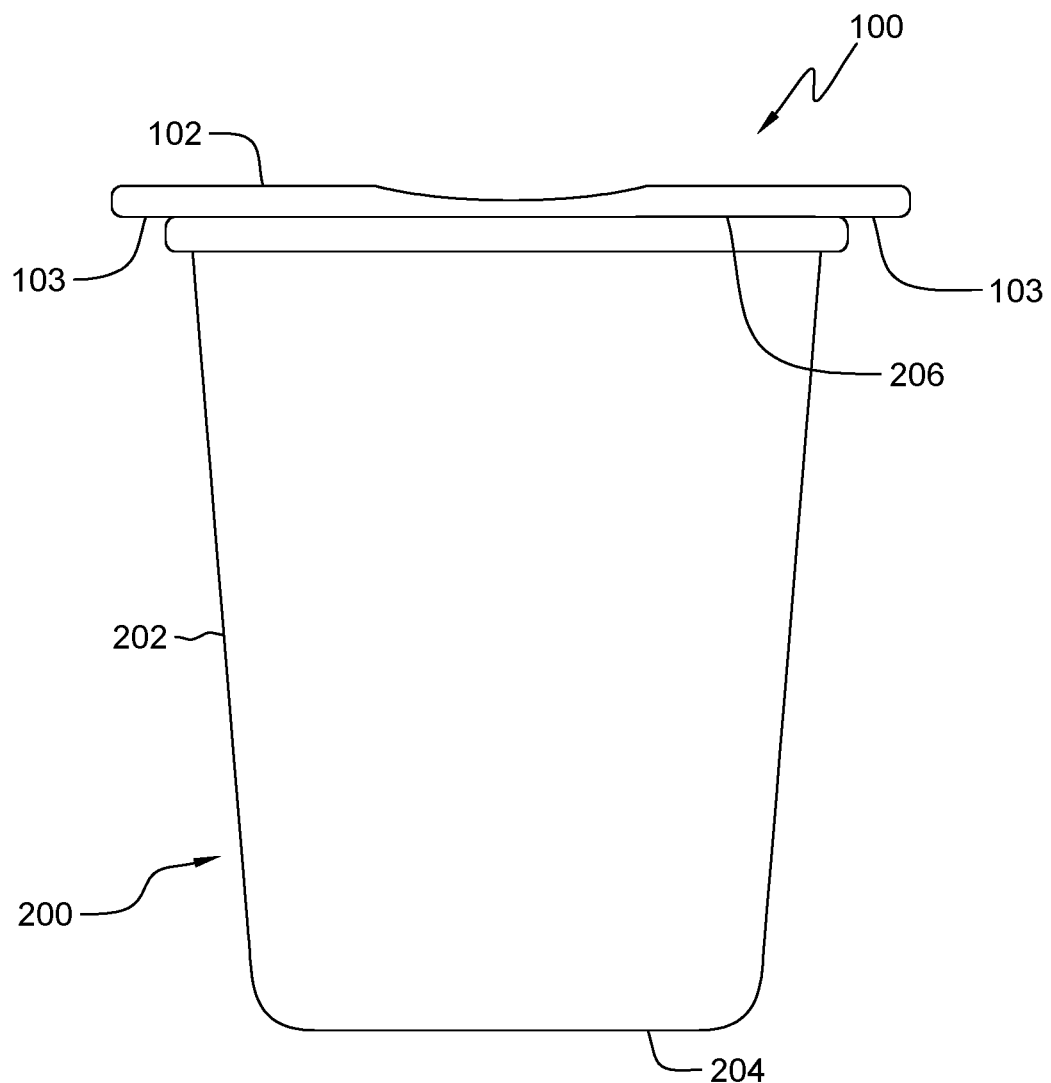
FIG. 5 illustrates a side view of an embodiment of the present invention wherein the litter sifter basket is contained within a receptacle bin of the present invention.

FIG. 5 illustrates a perspective view of a second embodiment of the litter sifter basket 100B of the present invention. The litter sifter basket 100B has at least one end plate 106, and a second embodiment of the pouring spout 118. In the depicted embodiment, the pouring spout 118 extends outwards from the edges of the sifter basket 100B, funnel the remaining waste within the sifter basket 100B to a narrowed opening. In the depicted embodiment, the pouring spout 118 extends slightly over the lip 103 of the sifter basket 100B and is present on each end of the sifter basket 100B. In additional embodiments, the pouring spout 118 may have various shapes and designs based on the intended waste which will be poured out of the sifter basket 100B.

In additional embodiments, the sifter basket 100B the at least one end plate 106, and the pouring spout 118. In some embodiments, each of the at least one end plate 106 has a pouring spout 118. In additional embodiment, one of the at least one end plate 106 may have a pouring spout 118. The at least one end plate 106 is similar in fashion as the previous two embodiments, designed to direct the waste towards the center and bottom of the screen 104. The pouring spout 118 assists in removing the waste which does not pass through the screen 104 into a receptacle, such as a garbage can. In some embodiments, the pouring spout 118 has a concaved funnel designed to assist in directing the waste when removing from the sifter basket 100B. Various shapes, angles, curvatures, and walled designs are possible based on the intended use of the sifter basket 100B. In some embodiments, the pouring spout 118 is integrated into both the at least one end plate 106. In some embodiments, the pouring spout 118 and the at least one end plate 106 are a unitary design. In additional embodiments, the pouring spout 118, may be an attachment, which is then secured to one or the other of the at least one end plate 106. The screen 104 traversing the space between the end plate 106, with handles 108 positioned distal to the screen 104 portion of the sifter basket 100B.

Figure 6:
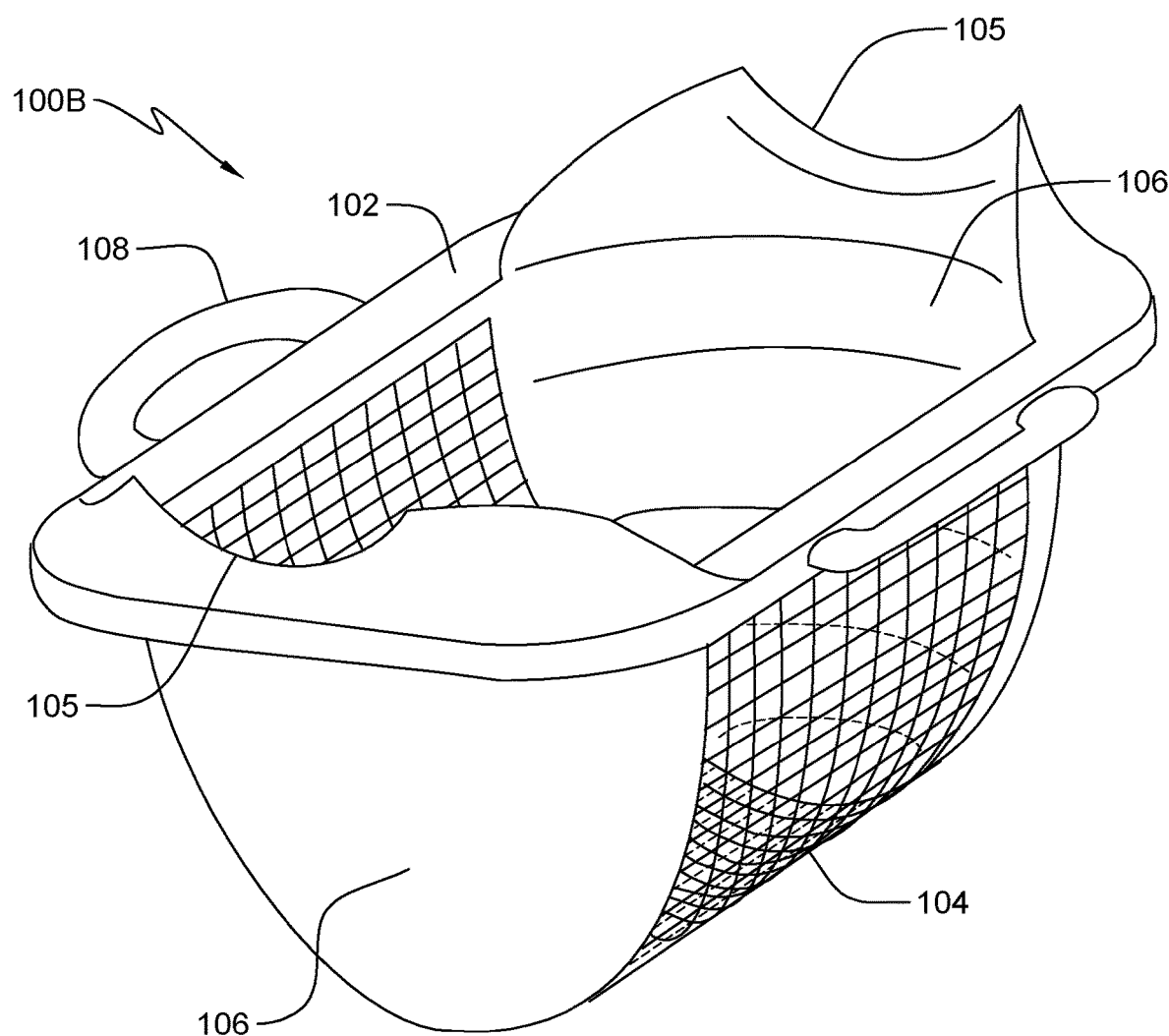
FIG. 6 illustrates a perspective view of a second embodiment of the present invention of the litter sifter basket of the present invention.
Figure 7:
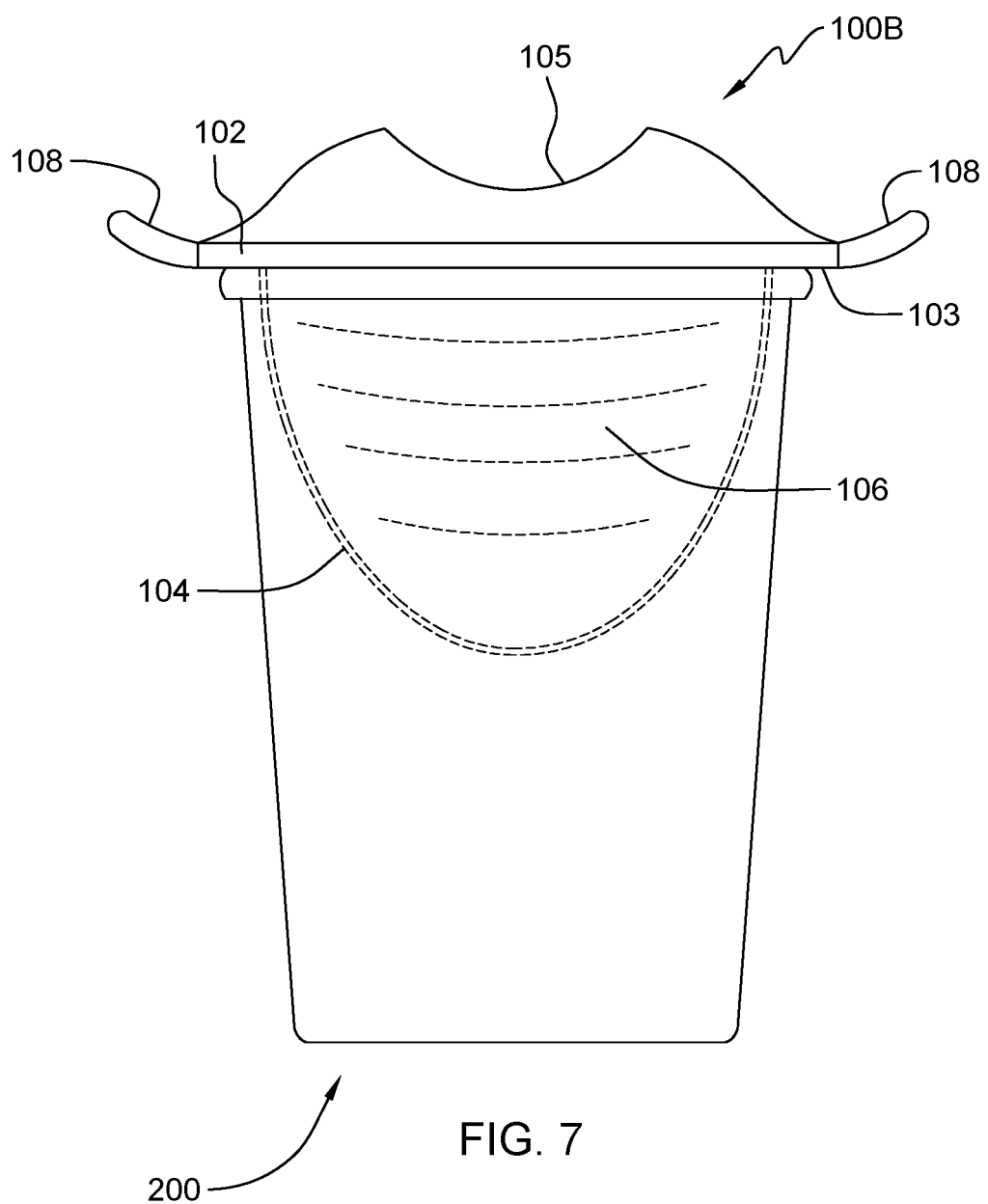
FIG. 7 illustrates a side view of second embodiment of the litter sifter basket within the receptacle of the present invention.

FIG. 6 illustrates a side view of a second embodiment of the present invention wherein the litter sifter basket 100B is contained within the receptacle 200 to form an litter sifter 200 of the present invention. The litter sifter basket 100B, which has at least one rounded and expanded end plate 106, which forms at least one side of the sifter basket 100B, to allow for easy disposal of waste from the sifter basket 100B. FIG. 5, further illustrates the at least one end plate 106, having a pouring spout 118, at the top of each of the at least one end plate 106, to assist in waste disposal. In the depicted embodiment, the pouring spout 118 extends upwards from the sifter basket 100B and inwards to create a more narrowed opening.

In operation, the user pours dirty litter inside the receptacle 200. The litter travels through the litter sifter basket 100 and the litter sifter basket 100 holds the waste while clean litter quickly passes through into the receptacle 200 below. The user then lifts the litter sifter basket 100 and disposes of the waste, sets the litter sifter basket 100 down, and then pours the cleaned litter from the receptacle 200 back into a separate litter box.

The types of litter that may be cleaned using the present invention include those types that are well known by those of skill in the art. Such litter types include non-clumping and clumping litter which forms clumped aggregates to contain liquid waste. Clay-type, moisture-absorbing types, for example, silica gel litter, may be effectively used with the present invention and methods to collect and remove solid waste.

The variations in the elements of the invention will be readily understood by one of skill in the art to be interchangeable with the elements described herein. These descriptions of the litter sifter element variations in the present invention are intended to be exemplary and are not intended to be limiting in any way.

I claim:

1. An animal litter sifter comprising:
a sifter receptacle comprising an internal chamber with an opening, and having a top edge; and
a rigid sifter basket having a top rim with a bottom edge and a middle portion of the sifter basket having a plurality of passages therethrough and extending from the bottom edge of the top rim and a first end and a second end have an impermeable design with a set of ridges integrated into the first end and the second end, and wherein a spout is integrated into the first end extending upwards away and a set of handles integrated into the top rim on opposing sides of the middle portion, and wherein the top edge of the sifter receptacle and the bottom edge of the sifter basket are in contact forming a close fitting junction.

2. The animal litter sifter of claim 1, wherein a bottom of the sifter basket is half the distance to the bottom of the sifter receptacle from the top edge.

3. The animal litter sifter of claim 1, wherein the sidewalls of the sifter basket with the plurality of passages therethrough, the plurality of passages are less than one centimeter wide.

4. The animal litter sifter of claim 1, wherein the first end and the second end have a concave shape.

5. The animal litter sifter of claim 1, wherein the middle portion of the sifter basket is curved.

6. The animal litter sifter of claim 1, wherein a bottom portion of the sifter basket is curved.

7. An animal litter sifter comprising:
a sifter receptacle having an internal chamber with an opening, and having a top edge;
a sifter basket comprising:
a top rim having a bottom edge,
a first end having a concave shape and a set of ridges integrated into the first end, and wherein the first end is integrated into the bottom edge of the top rim,
a second end having a concave shape and a set of ridges integrated into the second end, and wherein the second end is integrated into the bottom edge of the top rim opposing the first end,
a screen integrated into the bottom edge of the top rim and integrated with the first end and the second end, wherein a basket is formed,
a set of handles, wherein the handles are integrated into the top rim where the screen is integrated into the top rim and the handles are on opposite sides of the top rim, and
a spout integrated into the first end extending upwards from the top rim,
wherein the bottom edge of the top rim comes in continuous contact with the top edge of the sifter receptacle and a bottom of the sifter basket extends at least halfway into the internal chamber of the sifter receptacle.

\* \* \* \* \*